United States Patent
Amundson et al.

(10) Patent No.: US 6,385,368 B1
(45) Date of Patent: May 7, 2002

(54) METHOD AND APPARATUS FOR MODULATING SIGNAL STRENGTH WITHIN OPTICAL SYSTEMS

(75) Inventors: Karl R. Amundson, Cambridge, MA (US); Todd Christian Haber, Roswell, GA (US); Jefferson Lynn Wagener, Aberdeen, WA (US); Robert Scott Windeler, Clinton, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/257,351

(22) Filed: Feb. 19, 1999

Related U.S. Application Data

(60) Provisional application No. 60/075,319, filed on Feb. 20, 1998.

(51) Int. Cl.[7] .................................................. G02B 6/26
(52) U.S. Cl. .............................. 385/28; 385/12; 385/27; 385/31; 385/37
(58) Field of Search ........................ 385/12–15, 27–28, 385/31, 37, 123, 127–128; 250/227.11, 227.14, 227.17, 227.18; 359/341, 566

(56) References Cited

U.S. PATENT DOCUMENTS

| | | | | |
|---|---|---|---|---|
| 5,430,817 A | | 7/1995 | Vengsarkar ................... 385/37 |
| 5,641,956 A | * | 6/1997 | Vengsarkar et al. ........... 385/28 |
| 5,647,039 A | | 7/1997 | Judkins ......................... 385/37 |
| 5,732,170 A | * | 3/1998 | Okude et al. .................. 385/28 |
| 5,757,540 A | * | 5/1998 | Judkins et al. ................ 385/37 |
| 5,841,131 A | * | 11/1998 | Schroeder et al. ............. 385/37 |
| 5,864,641 A | * | 1/1999 | Murphy et al. ................ 385/12 |
| 5,907,647 A | * | 5/1999 | Eggleton et al. .............. 385/28 |
| 6,011,886 A | * | 1/2000 | Abramov et al. ............. 385/37 |
| 6,058,226 A | * | 5/2000 | Starodubov ................... 385/28 |

* cited by examiner

*Primary Examiner*—Frank G. Font
*Assistant Examiner*—Sang H. Nguyen

(57) ABSTRACT

Embodiments of the invention include an optical system apparatus and method for modulating the strength of a grating such as a long period grating (LPG) within optical systems and devices by varying the light transmission and loss characteristics of the cladding mode, rather than varying the effective refractive index of the fiber layers. According to embodiments of the invention, the use of a light-scattering or light absorptive material in the cladding of the optical fiber or other optical energy transmission medium causes the cladding to switch between a first state that effectively allows coherent coupling of cladding modes and a second state that effectively prevents coherent coupling of cladding modes. The light-scattering materials include electro-optic materials that cause the cladding to switch between the first and second states based on the presence (or absence) of an electric field, magneto-optic materials that cause the cladding to switch between the first and second states based on the presence (or absence) of a magnetic field, and materials capable of phase transitions that cause the cladding to switch between the first and second states based on temperature. The light-absorptive materials include dopants that cause the cladding to switch between the first and second states based on the wavelength of the optical energy. Embodiments of the invention differ from conventional optical media in that, according to embodiments of the invention, the cladding mode loss (attenuation) is varied rather than conventional changes in the index of refraction. The magnitude of the loss according to embodiments of the invention depends on the specification arrangements employed, but such loss typically is defined in dB per unit length in the given cladding mode.

24 Claims, 3 Drawing Sheets

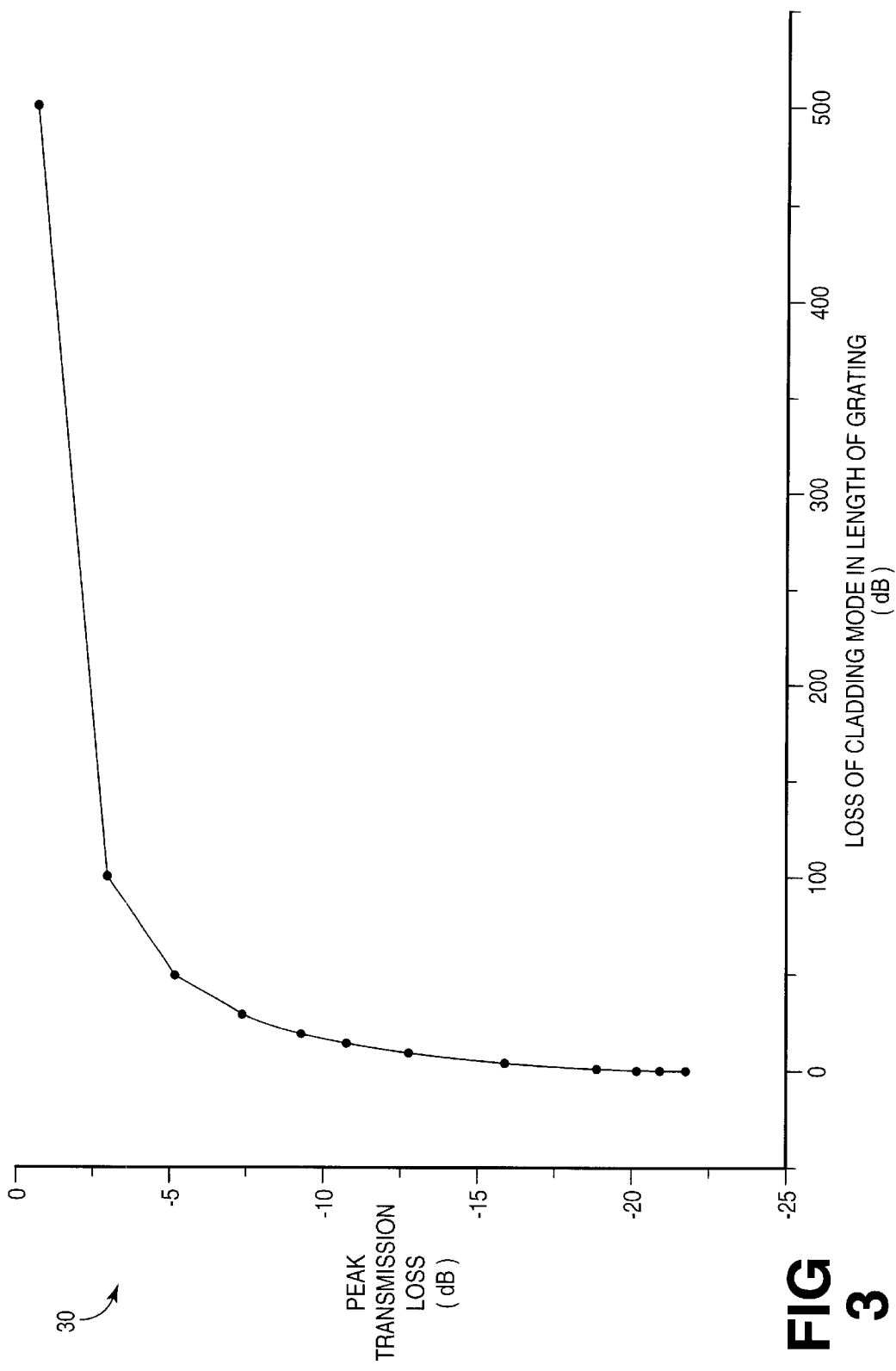

METHOD AND APPARATUS FOR MODULATING SIGNAL STRENGTH WITHIN OPTICAL SYSTEMS

CROSS-REFERENCE TO RELATED APPLICATION

This application claims priority of U.S. Provisional Application Serial No. 60/075,319, filed Feb. 20, 1998.

BACKGROUND OF THE INVENTION

1. Field of the Invention

The invention relates to optical systems, devices and methods and more particularly to optical systems, devices and methods employing long period gratings with modulated strength characteristics and capabilities.

2. Description of the Related Art

The ability to control the light transmission characteristics within optical fiber communications systems is advantageous, e.g., for purposes of amplification, switching filtering and transmission within the system. The modification of optical fiber transmission characteristics using gratings including long period gratings (LPGs) is discussed, e.g., in U.S. Pat. Nos. 5,430,817 and 5,647,039. In general, gratings are periodic changes in the index of refraction of the photosensitive core of an optical fiber. U.S. Pat. No. 5,647,039 discloses the use of long period gratings (e.g., gratings with periodicities greater than approximately 50 microns) to modify the transmission characteristics of an optical fiber by switchably changing the effective refractive index of the optical fiber to perturb the core mode or the cladding mode of optical information transmitted through the system. Similarly, U.S. Pat. No. 5,647,039 discloses the use of an optical device and system that makes use of changes in refractive index within the optical fiber to affect the content and transmission characteristics of the core mode and the cladding mode.

SUMMARY OF THE INVENTION

The invention is embodied in an apparatus and method for modulating the strength of a grating such as a long period grating (LPG) within optical systems and devices by varying the light transmission and loss characteristics of the cladding mode, rather than varying the effective refractive index of the fiber layers. Varying the transmission characteristics of the cladding mode correspondingly affects the strength of the grating (i.e., amplitude modulation).

According to embodiments of the invention, the use of a light-scattering or light-absorptive material in the cladding of the optical fiber or other optical energy transmission medium causes the cladding to vary or switch between a first state that effectively allows coherent coupling to the cladding modes and a second state that effectively prevents coherent coupling to the cladding modes. The light-scattering materials include electro-optic materials that cause the cladding to switch between the first and second states based on the presence (or absence) of an electric field, magneto-optic materials that cause the cladding to switch between the first and second states based on the presence (or absence) of a magnetic field, and materials capable of phase transitions that cause the cladding to switch between the first and second states based on temperature. The light-absorptive materials include dopants that cause the cladding to switch between the first and second states based on the wavelength of the optical energy.

Embodiments of the invention include arrangements in which the cladding includes one or more holes filled with a light scattering or absorptive medium. The holes are formed, e.g., longitudinally down the length of the cladding and generally parallel to the fiber core. Alternative embodiments of the invention include one or more light-scattering or light-absorptive coatings applied to the outer surface of the cladding, and one or more light-scattering or light-absorptive regions within the cladding that are coaxial with the fiber core.

Embodiments in accordance with the invention differ from conventional optical media in that the cladding mode loss (attenuation) is varied rather than varying the index of refraction in conventional arrangements. The magnitude of the loss according to embodiments of the invention depends on the specification arrangements employed, but such loss typically is measured in decibels (dB) per unit length in the given cladding mode.

BRIEF DESCRIPTION OF THE DRAWINGS

In the drawings:

FIG. 3 is a graphical diagram of the peak attenuation characteristics of a long period grating according to an embodiment of the invention as a function of cladding loss per unit of long period grating;

DETAILED DESCRIPTION

Although specific features, configurations and arrangements are discussed hereinbelow, it should be understood that such is done for illustrative purposes only. A person skilled in the relevant art will recognize that other steps, configurations and arrangements can be used without departing from the spirit and scope of the invention.

According to embodiments of the invention, the transmission characteristics of optical energy transmission media such as optical fibers with long period gratings (LPGs) are varied by adjusting the light-scattering or light-absorptive characteristics of the media's cladding region. Such is done by frustrating the coherent coupling of optical energy to the cladding modes, e.g., by changing the light-scattering or light-absorptive characteristics of the cladding region. The light transmission characteristics of the cladding region contributes significantly to the overall light transmission within the optical fiber.

According to embodiments of the invention, the light-scattering or light-absorptive characteristics of the media's cladding region is varied or switchably adjusted between a first state in which optical energy within the cladding is significantly scattered or absorbed to the extent that coherent coupling of optical energy to the cladding modes substantially is reduced or eliminated, and a second state in which the scattering or absorption of optical energy within the cladding is significantly reduced to the extent that optical energy is coherently coupled to the cladding modes. Increases in the coherent coupling of light to the cladding modes improves the overall transmission of light through the optical fiber.

According to embodiments of the invention, the light-scattering or light-absorptive characteristics of the media's cladding region is affected by the presence of one or more of a number of materials, including, e.g., electro-optic materials, magneto-optic materials, temperature-dependent materials capable of phase transition, and dopant-containing light-absorptive materials. Electro-optic materials scatter light based on the presence or absence of an electric field. Similarly, magneto-optic materials scatter light based on the presence or absence of a magnetic field.

The light-scattering characteristics of the media's cladding region also is affected, e.g., by the presence of one or more temperature-dependent, phase transition materials. Such materials transition between phases that, depending on the temperature, either allow or prevent coherent coupling of cladding modes.

Furthermore, the light-scattering characteristics of the media's cladding region is affected by the presence of light-absorptive materials, including materials having dopants that absorb optical energy based on its wavelength.

Figure 1:
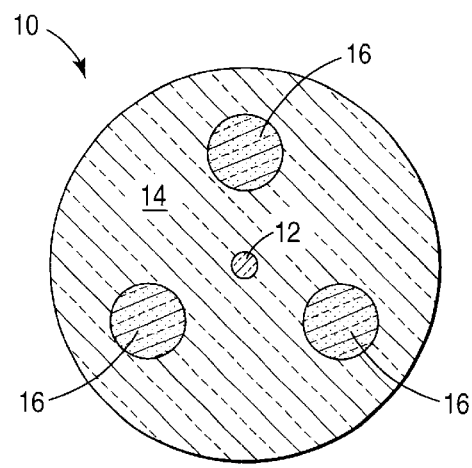
FIG. 1 is a partial cross-sectional side view of an optical fiber according to an embodiment of the invention.

An exemplary embodiment of the invention is shown, e.g., in FIG. 1. In this figure, an optical fiber or optical fiber arrangement 10 includes, e.g., a fiber core 12, surrounded by a cladding region 14. Within the cladding region 14 are one or more hole regions 16 formed, e.g., longitudinally down the length of the cladding region 14 and generally parallel to the fiber core 12. According to an embodiment of the invention, the hole regions 16 contain, e.g., one or more light-scattering electro-optic materials such as polymer dispersed liquid crystal (PDLC). Alternatively, the hole regions 16 contain, e.g., one or more light-scattering magneto-optic materials or temperature-dependent materials capable of phase transition, or one or more dopant-containing light-absorptive materials.

In operation, when no field is applied, the light-scattering material in the hole regions 16 is in a first state of scattering light that tries to propagate in the region of the holes (i.e., cladding mode light). The scattering works to prevent the coherent coupling of light from the core mode to the cladding mode, and thus effectively eliminates the conventional dip in transmission for long period gratings.

However, when a field of sufficient strength is applied to the light-scattering material, the light-scattering material assumes a second state by effectively becoming transparent, thus allowing coherent coupling of light from the core mode to the cladding mode. In this manner, the cladding mode does not experience significant attenuation and thus allows, e.g., a long period grating to yield traditional or conventional long period grating transmission characteristics.

Figure 2:
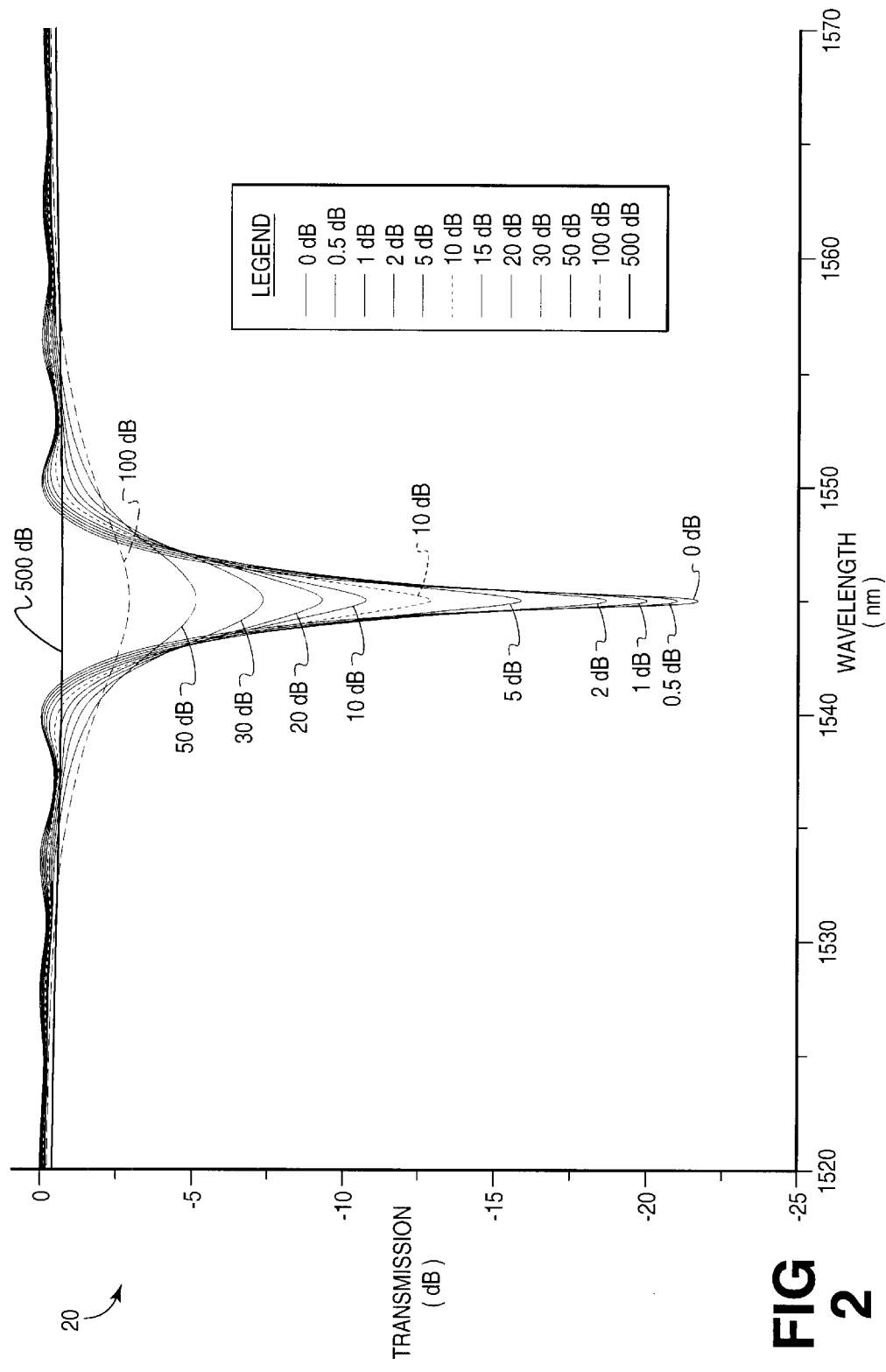
FIG. 2 is a graphical diagram of the transmission characteristics of a long period grating (LPG) according to an embodiment of the invention as a function of wavelength for various degrees of cladding mode loss.

Referring now to FIG. 2, a plot 20 of the transmission spectra of an exemplary long period grating as a function of wavelength for various cladding mode loss scenarios is shown. A 0 dB curve, which corresponds to a 0 decibel (dB) loss in the cladding mode, illustrates a conventional transmission spectrum for a long period grating. Similarly, curves corresponding to cladding losses of 0.5 dB, 1 dB, 2 dB, 5 dB, 10 dB, 15 dB, 20 dB, 30 dB, 50 dB, 100 dB, 500 dB are shown. As can be seen, as the loss of the cladding mode increases, the strength of the long period grating decreases, i.e., the attenuation about the wavelength, e.g., of approximately 1545 nanometers (nm) decreases.

For example, as shown, for a scenario of 10 dB of cladding mode loss, the attenuation strength of the long period grating depicted in FIG. 2 has been reduced by approximately 7.5 dB (i.e., from approximately −20 dB to approximately 12.5 dB) at 1545 nm, as shown by the difference in dB loss between the 0 dB curve and the 10 dB curve. Similarly, for a scenario of 100 dB of cladding loss, the attenuation strength of the long period grating has been reduced by approximately 17.5 dB, i.e., the difference in dB loss between the 0 dB curve and the 100 dB curve.

In this manner, the loss of attenuation strength per unit length of long period grating (dB/grating length) is an important loss measurement. From a practical standpoint, the cladding mode has some loss, even for the scenario in which the cladding mode loss theoretical is 0 dB. However, low cladding loss scenarios, e.g., a loss of 0.5 dB, is not that different from the scenario in which the cladding loss is 0 dB.

Referring now to FIG. 3, a plot 30 of the peak attenuation characteristics of a long period grating as a function of cladding loss per unit length of long period grating is shown. As can be seen, in general, as the total cladding loss increases, the peak attenuation drops relatively quickly, and eventually flattening out at approximately the 100 dB/grating length loss level.

According to embodiments of the invention loss inherent in electro-optic material such as polymer dispersed liquid crystal (PDLC) typically is, e.g., approximately 0.025 dB/micron ($\mu$m) for aligned liquid crystal drops and approximately 2.0 dB/micron ($\mu$m) for non-aligned liquid crystal drops. For example, for a length of PDLC of approximately 1 centimeter (cm), light propagating therein experiences a loss of approximately 20,000 dB for aligned liquid crystal drops, but only 250 dB for non-aligned liquid crystal drops. Both of these loss levels are relatively excessive when compared to the desired range of losses shown, e.g., in FIG. 3.

However, not all of the cladding mode propagates in the PDLC. The choice of the particular optical fiber design and the cladding mode used often results in only a small percentage of the light to propagate in the PDLC. For example, if the PDLC is inserted in the hole regions 16 as shown in FIG. 1, a ratio of the hole region area to the fiber (cladding) area equal to approximately 1% would yield approximately 1% of the cladding mode light in the PDLC. Accordingly, in this arrangement, the range of cladding mode loss between aligned PDLC drops and non-aligned PDLC drops is approximately 2.5 dB/cm to approximately 200 dB/cm, respectively. For a grating length of approximately a few millimeters (mm) to a few centimeters (cm), this range is more approachable to desired levels.

Figure 4:
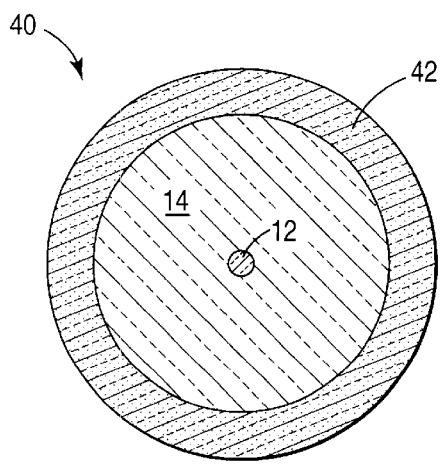
FIG. 4 is a partial cross-sectional side view of an optical fiber according to an alternative embodiment of the invention.

Referring now to FIG. 4, an arrangement 40 according to another embodiment of the invention is shown. In this arrangement, an optical energy transmission medium such as an optical fiber has a core 12 and a cladding region 14. The cladding region 14 is coated as shown with a coating region 42 including at least one light-scattering or light-absorbing material such as a low index polymer-dispersed liquid crystal (PDLC). Alternatively, as shown in FIG. 5, one or more light-scattering or light-absorbing regions 44 are contained within the cladding region (shown generally in FIG. 5 as 14a and 14b) and substantially coaxial with the core 12.

Figure 5:
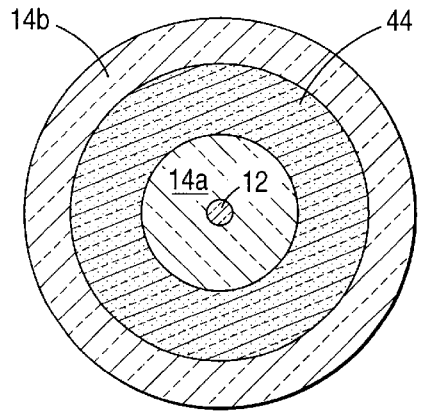
FIG. 5 is a partial cross-sectional side view of an optical fiber according to another alternative embodiment of the invention.

In the arrangements shown in FIGS. 4 and 5, when no electric (or magnetic) field is applied to the light-scattering material, the light-scattering material is in a first state whereby the material is highly scattering. The highly scattering state makes the cladding mode very lossy, thus preventing most coherent coupling to the cladding mode. Accordingly, the conventional notch in the transmission spectra essentially is eliminated. Correspondingly, the core mode experiences relatively little loss, i.e., very similar to the loss of a standard long period grating at a wavelength significantly different than the phase matched wavelength.

When an electric field is applied to the light-scattering material, the light-scattering material switches to a second state whereby the scattering loss is significantly reduced. In this reduced scattering state, during operation, the original grating structure is recovered. The original grating structure is equivalent to having the light-scattering region 44 made of a standard low index polymer.

With respect to the embodiments shown in FIGS. 4 and 5, specific cladding loss levels and ranges between the first and second states of the light-scattering materials are determined by, inter alia, how much the cladding mode extends into the light-scattering region. However, according to embodiments of the invention, such amount typically is less than approximately 5% in a conventional optical fiber.

The embodiments discussed hereinabove use one or more light-scattering materials to induce scattering loss in the cladding mode. However, according to other embodiments of the invention, such arrangements use materials that provide absorptive loss. For example, one type of absorptive loss is the presence of one or more light-absorbing dopants in the fiber cladding that is not in the fiber core. The dopant(s) create absorptive loss, which prevents coherent coupling. For wavelengths in the 1550 nanometer (nm) region, an exemplary dopant is erbium. To remove the absorptive loss, an optical pump is used to bleach the dopant (980 nm or 1480 nm for erbium).

Figure 6:
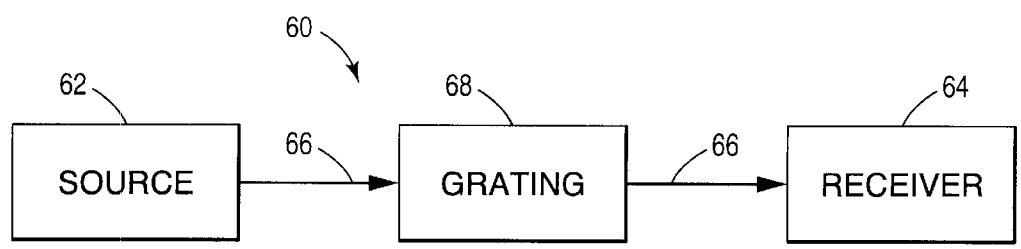
FIG. 6 is a simplified schematic diagram of an optical system in which embodiments of the invention are useful.

Referring now to FIG. 6, shown is a simplified schematic diagram of an optical system 60 in which embodiments of the invention are useful. The optical communications system 60 includes one or more optical sources or transmitters 62, one or more optical receivers 64, and an optical energy transmission medium 66 coupled therebetween. The optical energy transmission medium 66 includes one or more long period gratings 68, e.g., a long period grating. The optical energy transmission medium 66 and/or the grating 68 includes a cladding region configured in accordance with embodiments of the invention, e.g., as discussed hereinabove.

It will be apparent to those skilled in the art that many changes and substitutions can be made to the embodiments of the fiber optic systems, devices and methods herein described without departing from the spirit and scope of the invention as defined by the appended claims and their full scope of equivalents.

What is claimed is:

1. Apparatus for varying the transmission of optical energy in an optical waveguide system including a source of optical energy, at least one receiver for receiving said optical energy, and an optical energy transmission medium operably coupled to said source and said receiver for transmitting said optical energy therebetween, said optical energy transmission medium including a core and a cladding formed on at least a portion of said core, said apparatus comprising:

a long period grating (LPG) operably disposed in said optical energy transmission medium for coherently coupling at least one mode of optical energy;

at least one material disposed in at least a portion of said cladding, said material being capable of scattering light from said cladding to vary the coherent coupling of a mode of optical energy occupying a region of said optical transmission medium other than said cladding to a mode of optical energy occupying said cladding, wherein the transmission of said optical energy within said optical waveguide system is related to the coherent coupling of the optical energy occupying said cladding.

2. The apparatus as recited in claim 1, wherein at least a portion of said material is a light-scattering, electro-optic material, and wherein said light-scattering, electro-optic material is coupled to said cladding to vary the coherent coupling to the mode of optical energy occupying said cladding based on the presence of an electric field.

3. The apparatus as recited in claim 1, wherein at least a portion of said material is a light-scattering, magneto-optic material, and wherein said light-scattering, magneto-optic material is coupled to said cladding to vary the coherent coupling to the mode of optical energy occupying said cladding based on the presence of a magnetic field.

4. The apparatus as recited in claim 1, wherein at least a portion of said material is capable of phase transitions that allow the coherent coupling to the mode of optical energy occupying said cladding to vary based on temperature.

5. The apparatus as recited in claim 1, wherein at least a portion of said material includes a light-absorptive dopant that allows the coherent coupling to the mode of optical energy occupying said cladding to vary based on the wavelength of said optical energy.

6. The apparatus as recited in claim 1, wherein said cladding has formed therein at least one region of a material selected form the group consisting of light-scattering electro-optic material, light-scattering magneto-optic material, light-scattering phase transition material, and light-absorptive material.

7. The apparatus as recited in claim 6, wherein said optical energy transmission medium further comprises an optical fiber having a longitudinal axis, wherein said cladding has formed therein at least one hole having a longitudinal axis substantially parallel to said longitudinal axis of said optical fiber, and wherein said at least one hole is filled with at least one material selected form the group consisting of light-scattering electro-optic material, light-scattering magneto-optic material, light-scattering phase transition material, and light-absorptive material.

8. The apparatus as recited in claim 6, wherein said optical energy transmission medium further comprises an optical fiber having a longitudinal axis, and wherein said at least one region is coaxial with said optical fiber.

9. The apparatus as recited in claim 1, wherein said cladding has formed thereon at least one coating of a material selected form the group consisting of light-scattering electro-optic material, light-scattering magneto-optic material, light-scattering phase transition material, and light-absorptive material.

10. An optical switch, comprising:

an optical energy transmission medium having a core;

a (long period) grating (LPG) operably coupled to said optical energy transmission medium;

a cladding region formed on said at least a portion of said core and said grating; and at least one material disposed in said cladding wherein, in a first state, said material substantially allows coherent coupling of a mode of optical energy occupying a region of said optical transmission medium other than said cladding to a mode of optical energy occupying said cladding and, in a second state, substantially prevents coherent coupling of a mode of optical energy occupying a region of said optical transmission medium other than said cladding to a mode of optical energy occupying said cladding, wherein said material is switchable between said first state and second state.

11. The optical switch as recited in claim 10, wherein at least a portion of said material is a light-scattering, electro-optic material, and wherein said light-scattering, electro-optic material is coupled to said cladding to switch the coherent coupling to the mode of optical energy occupying said cladding between said first state and said second state based on the presence of an electric field.

12. The optical switch as recited in claim 10, wherein at least a portion of said material is a light-scattering, magneto-optic material, and wherein said light-scattering, magneto-optic material is coupled to said cladding to switch the coherent coupling to the mode of optical energy occupying said cladding between said first state and said second state based on the presence of a magnetic field.

13. The optical switch as recited in claim 10, wherein at least a portion of said material is capable of phase transitions that allow the coherent coupling to the mode of optical energy occupying said cladding to switch between said first state and said second state based on temperature.

14. The optical switch as recited in claim 10, wherein at least a portion of said material includes a light-absorptive dopant that allows the coherent coupling to the mode of optical energy occupying said cladding to switch between said first state and said second state based on the wavelength of said optical energy.

15. The optical switch as recited in claim 10, wherein said cladding has formed therein at least one region of a material selected form the group consisting of light-scattering electro-optic material, light-scattering magneto-optic material, light-scattering phase transition material, and light-absorptive dopants.

16. The optical switch as recited in claim 15, wherein said optical energy transmission medium further comprises an optical fiber having a longitudinal axis, wherein said cladding has formed therein at least one hole having a longitudinal axis substantially parallel to said longitudinal axis of said optical fiber, and wherein said at least one hole is filled with at least one material selected form the group consisting of light-scattering electro-optic material, light-scattering magneto-optic material, light-scattering phase transition material, and light-absorptive dopants.

17. The optical switch as recited in claim 15, wherein said optical energy transmission medium further comprises an optical fiber having a longitudinal axis, and wherein said at least one region is coaxial with said optical fiber.

18. The optical switch as recited in claim 10, wherein said cladding has formed thereon at least one coating of a material selected form the group consisting of light-scattering electro-optic material, light-scattering magneto-optic material, light-scattering phase transition material, and light-absorptive dopants.

19. A method of varying the transmission of optical energy in an optical waveguide system including a source of optical energy, at least one receiver for receiving said optical energy, and an optical energy transmission medium operably coupled to said source and said receiver for transmitting said optical energy therebetween, said optical energy transmission medium including a core and a cladding formed on at least a portion of said core, said method comprising the steps of:

providing an optical energy transmission medium having a (long period) grating operably coupled to said optical energy transmission medium for coherently coupling at least one mode of optical energy;

disposing at least one light-altering material in said cladding, said light-altering material being capable of altering light from said cladding to vary the coherent coupling of a mode of optical energy occupying a region of said optical transmission medium other than said cladding to a mode of optical energy occupying said cladding; and altering light from said cladding to vary the coherent coupling between a first state wherein said light-altering material substantially allows coherent coupling of a mode of optical energy occupying a region of said optical transmission medium other than said cladding to a mode of optical energy occupying said cladding and a second state wherein said light-altering material substantially prevents coherent coupling of a mode of optical energy occupying a region of said optical transmission medium other than said cladding to a mode of optical energy occupying said cladding, wherein the transmission of said optical energy within said optical waveguide system is related to the coherent coupling of the optical energy occupying said cladding.

20. The method as recited in claim 19, wherein at least a portion of said light-altering material is a light-scattering, electro-optic material, and wherein said altering step further comprises scattering light to vary the coherent coupling to the mode of optical energy occupying said cladding based on the presence of an electric field.

21. The method as recited in claim 19, wherein at least a portion of said light-altering material is a light-scattering, magneto-optic material, and wherein said altering step further comprises scattering light to vary the coherent coupling to the mode of optical energy occupying said cladding based on the presence of a magnetic field.

22. The method as recited in claim 19, wherein at least a portion of said light-altering material is capable of phase transitions, and wherein said altering step further comprises scattering light to vary the coherent coupling to the mode of optical energy occupying said cladding based on temperature.

23. The method as recited in claim 19, wherein at least a portion of said light-altering material includes a light-absorptive dopant, and wherein said altering step further comprises absorbing light to vary coherent coupling to the mode of optical energy occupying said cladding based on the wavelength of said optical energy.

24. The method as recited in claim 19, wherein said altering step further comprises switching said light-altering material between said first state and second state.

* * * * *